W. A. Cobb,
Crank Paddle.
No. 66,797.   Patented July 16, 1867.
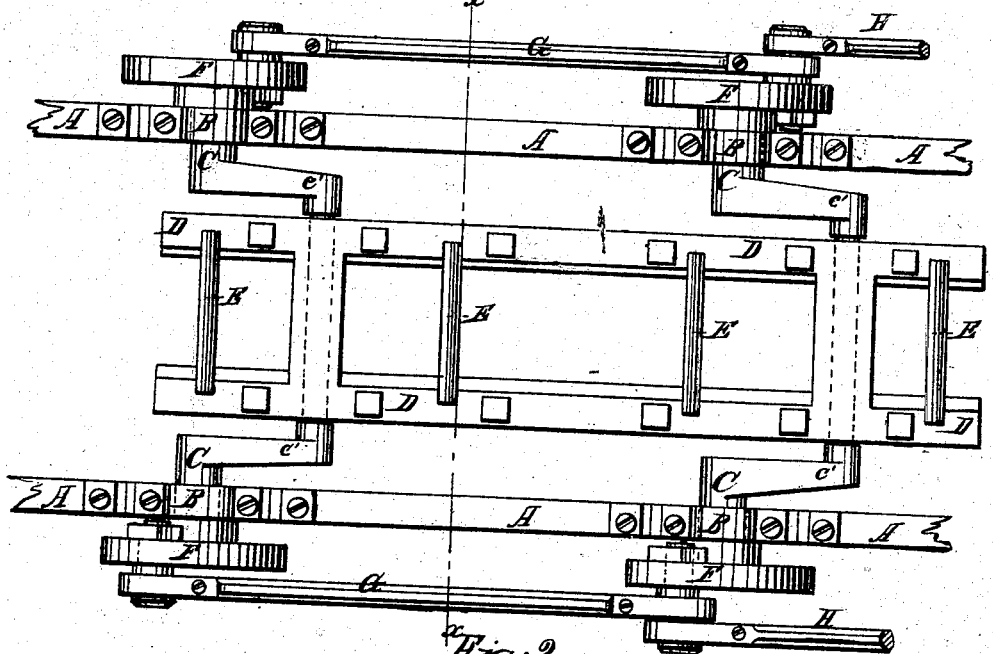
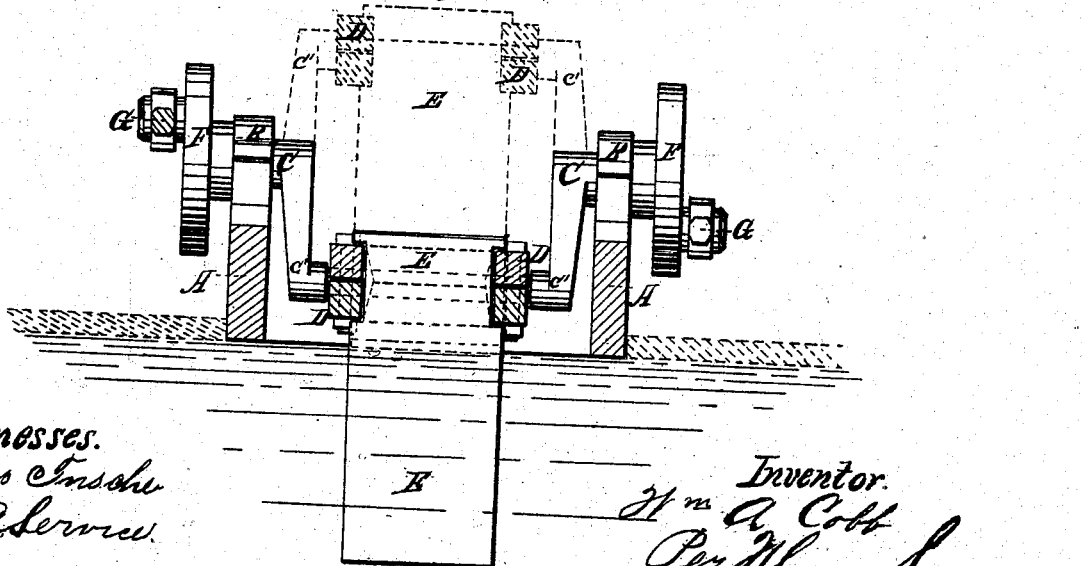
Witnesses.
Inventor.
Wm A Cobb
Per Munn & Co
Attorneys

UNITED STATES PATENT OFFICE.

WILLIAM A. COBB, OF ORANGE, MASSACHUSETTS.

Letters Patent No. 66,797, dated July 16, 1867.

---

IMPROVED PROPELLER.

---

*The Schedule referred to in these Letters Patent and making part of the same.*

---

TO ALL WHOM IT MAY CONCERN:

Be it known that I, WILLIAM A. COBB, of Orange, in the county of Franklin, and State of Massachusetts, have invented a new and useful improvement in Propelling Vessels; and I do hereby declare that the following is a full, clear, and exact description thereof, which will enable others skilled in the art to make and use the same, reference being had to the accompanying drawings, forming part of this specification, in which—

Figure 1 is a top view of my improved detached propeller.

Figure 2 is a vertical cross-section of the same, taken through the line $x\ x$, fig. 1.

Similar letters of reference indicate like parts.

My invention has for its object to furnish an improved propeller by means of which vessels may be propelled with greater speed, and with much less bulk and weight of machinery than is possible with the devices now in use; and it consists in the combination of the frame, or its equivalent, the paddles, the crank or cranks, the adjustable wheels, or their equivalent, the shackle-bars and the driving-rods with each other, and with the sills or frame upon which the whole rests, as hereinafter more fully described.

A are the sills or frame upon which the apparatus rests, and which is connected to and supported by the frame of the vessel. Upon the sills A are formed the bearings B for the crank-shafts C, the cranks $c'$ of which work in the frame D, to or within which a series of paddles, E, is attached, which by the action of the cranks $c'$ descend into the water, move back through it, rise and move forward above the water, and so on continuously, rapidly propelling the vessel through the water. To the outer ends of the cranks C are attached wheels F, which, if desired, may be replaced by crank-arms. G are shackle-bars connecting all the crank-wheels of the same frame D upon one side, so that they may all move together. H are the driving-rods by which motion is communicated to the apparatus from the engine. These machines are attached to the sides of the vessel opposite to each other, one, two, or three being placed upon each side of the vessel, and each operated entirely independent of the others. These machines may all act together, either forward or backward; or those on one side may work forward, while those upon the other side are made to back-water or work backward, turning the vessel in a very short space. In bringing the vessel up to the wind in a stiff breeze, all the propellers upon the windward side may be operated, while only one or two are used upon the lee side, thus enabling the vessel to be much more easily and readily kept to her course than when controlled entirely by the rudder.

I claim as new, and desire to secure by Letters Patent—

The propeller constructed as described, consisting of the frame D having the series of vertical paddles E, and hung at each end upon the crank-shafts C, between the sills A, said crank-shafts connected by the crank-wheels F and shackle-bars G, all operated directly from the engine by the driving-bars H, as herein shown and described for the purpose specified.

WILLIAM A. COBB.

Witnesses:
MOSES C. FRENCH,
NELSON S. WAKEFIELD.